(12) United States Patent
Sherman et al.

(10) Patent No.: US 10,313,295 B2
(45) Date of Patent: Jun. 4, 2019

(54) SCALABLE MESSAGING SYSTEM

(71) Applicant: DreamWorks Animation LLC, Glendale, CA (US)

(72) Inventors: Douglas E. Sherman, Glendale, CA (US); Justin Tang, Glendale, CA (US)

(73) Assignee: DreamWorks Animation L.L.C., Universal City, CA (US)

( * ) Notice: Subject to any disclaimer, the term of this patent is extended or adjusted under 35 U.S.C. 154(b) by 213 days.

(21) Appl. No.: 15/382,431

(22) Filed: Dec. 16, 2016

(65) Prior Publication Data

US 2018/0176174 A1     Jun. 21, 2018

(51) Int. Cl.
| | |
|---|---|
| *G06F 15/16* | (2006.01) |
| *H04L 12/58* | (2006.01) |
| *H04L 12/725* | (2013.01) |
| *H04L 29/08* | (2006.01) |
| *H04L 12/18* | (2006.01) |

(52) U.S. Cl.
CPC ............ *H04L 51/32* (2013.01); *H04L 45/302* (2013.01); *H04L 51/046* (2013.01); *H04L 51/066* (2013.01); *H04L 51/14* (2013.01); *H04L 51/26* (2013.01); *H04L 51/36* (2013.01); *H04L 67/1014* (2013.01); *H04L 67/2838* (2013.01); *H04L 67/322* (2013.01); *H04L 12/1859* (2013.01)

(58) Field of Classification Search
CPC ..................................................... H04L 51/10
See application file for complete search history.

(56) References Cited

U.S. PATENT DOCUMENTS

| | | | |
|---|---|---|---|
| 2010/0091965 A1* | 4/2010 | Ma ........................ | G06Q 30/02 379/142.05 |
| 2013/0111044 A1* | 5/2013 | Cherian ................ | H04W 76/10 709/228 |
| 2016/0021043 A1 | 1/2016 | Modi et al. | |
| 2016/0119262 A1* | 4/2016 | Siegel .................. | H04L 51/066 709/206 |
| 2016/0119274 A1 | 4/2016 | Ghafourifar et al. | |
| 2016/0219089 A1* | 7/2016 | Murthy ............... | H04L 65/4076 |

FOREIGN PATENT DOCUMENTS

EP     1793543 A1     6/2007

OTHER PUBLICATIONS

Extended European Search Report and European Search Opinion received for European Patent Application No. 17204718.5, dated May 2, 2018, 8 pages.

* cited by examiner

*Primary Examiner* — Yves Dalencourt
(74) *Attorney, Agent, or Firm* — Dentons US LLP

(57) ABSTRACT

A system and method provides a computer-implemented messaging service. Users subscribe to message channels. A message queue buffers messages to a router. The router determines whether characteristics of a first message match criteria specified in subscription requests, and may route the first message to one or more sending agents based on modes of communication specified in the subscription service requests. The sending agent(s) generate a second message formatted for the specified modes of communication based on the first message. Message load balancing, message queuing, message routing, and message sending services may all be independently scaled to adjust for demand.

48 Claims, 5 Drawing Sheets

SCALABLE MESSAGING SYSTEM

BACKGROUND

I. Field

This application relates generally to a method and system for sending messages to users, and more specifically, to routing messages to users across various modes of communication.

II. Related Art

Messenger services allow users to communicate across electronic network-connected devices. Consumer-targeted messenger services such as Windows Messenger™, Google Hangouts™, and AOL Instant Messenger™ allow two users on separate devices to communicate with one another by sending messages between the two devices. These messenger services send messages for display at a user interface of other devices running the same messenger service.

Messages can be sent between instances of the same service, with some of the messages being communicated between users across network-connected devices with the messenger service. Typically, these message services operate through a network server which receives and forwards messages based on a recipient designated in the message. This type of messaging service often provides users conversational capabilities with other users of the messaging service.

In some messaging services, there are only means for one-way communication. Examples of this type of messaging service include notification messaging services like those provided by Facebook™ and Google™. These messaging services only provide a notification to a user without giving the user an ability to respond or engage in a dialog with the sender. These notifications can be used to notify the user of web-based events like receipt of a message or comment on their online profile, or of real world events such as traffic on frequently traveled roads or severe weather alerts, but the notifications are limited to those running the specific messaging service.

Traditional messenger services implement a proprietary communications protocol between the various instances of the messenger service. These proprietary protocols allow developers of the messenger service to increase quality of service by controlling (e.g., limiting) variability in the implementations of the messenger service. Only those messenger services authorized by the developer can interface with the other messenger services using that proprietary protocol. As a result, the messenger service is not scalable within itself. In contrast, the whole messenger service must be replicated and run separately to increase capacity. Additionally, known messenger services are unable to interface with other communications channels.

Thus, there is a need in the art for a messenger service that allows for improved scalability and that interfaces with a plurality of communication channels.

BRIEF SUMMARY OF THE INVENTION

In one embodiment, a computer-implemented process for a messaging service includes receiving a message subscription service request at a router in which the message subscription service request includes message criteria. A sending agent is determined based on the message subscription service request. The router receives a first message, which includes a message parameter, and determines whether the message criteria match the message parameter. In response to a determination that the message criteria match the message parameter, the message is routed to the sending agent. A second message is generated at the sending agent based on the first message and the message subscription service request.

In one embodiment, the determination of the sending agent includes the determination that the first sending agent is from a plurality of sending agents including at least one of an email-generating sending agent, a text-generating sending agent, a websocket-generating sending agent, and a webhook-generating sending agent.

In one embodiment, a second message subscription service request is received at the router with the second message subscription service request including second message criteria. A third message including a second message parameter is received at the router and a determination is made whether the second message criteria match the second message parameter. In response to a determination that the second message criteria match the second message parameter, the third message is routed to the sending agent and a fourth message is generated at the sending agent based on the third message and the second message subscription service request.

In one embodiment, a second sending agent is determined based on the message subscription service request with the message routed to the second sending agent and a third message is generated at the second sending agent based on the first message.

In one embodiment, the first message is routed and saved to a persistent store including a distributed database management system. A request for the first message is stored in the persistent store. The first message is retrieved and sent to a message persistence service based on the request. Also, the first message is routed to the persistent store based on a determination that the message criteria match the message parameter.

In one embodiment the message is received from a message sender service. Increased traffic is detected at the message sender service so a second instance of the message sender service is generated. Additionally, the first message is buffered at a message queue before sending to the router. If increased traffic is detected at the message queue then a second instance of the message queue is generated.

In one embodiment, a third message is received at the router with the order of receipt of the first and third messages at the router determined by a Representational State Transfer (REST) proxy load balancer. In another embodiment, the message parameter includes at least one of a channel identifier, a sender identifier, an event identifier, a message type, a message tag, a message address, and message content. In yet another embodiment, messages are filtered between the router and the sending agent based on entitlements that correlate a user with specific message parameter permissions. Message subscription service requests are evaluated based on entitlements, and rejected before generating a message subscription if the message subscription service request fails the evaluation.

Systems and computer-readable storage media for a messaging service are also described.

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various examples are described below relating to a system for providing a messenger service. The examples below may also describe a computer-implemented method or computer-executed instructions. The messenger service provides for message communication between messaging clients. In some embodiments, the messenger service routes messages to a plurality of sending agents, with a sending agent associated with one of a plurality of modes of communication. In other embodiments, the various stages of the messaging service are compartmentalized so that a stage can be scaled individually based on messaging service demand. The various embodiments may be better appreciated with reference to the figures as described below.

Figure 1:
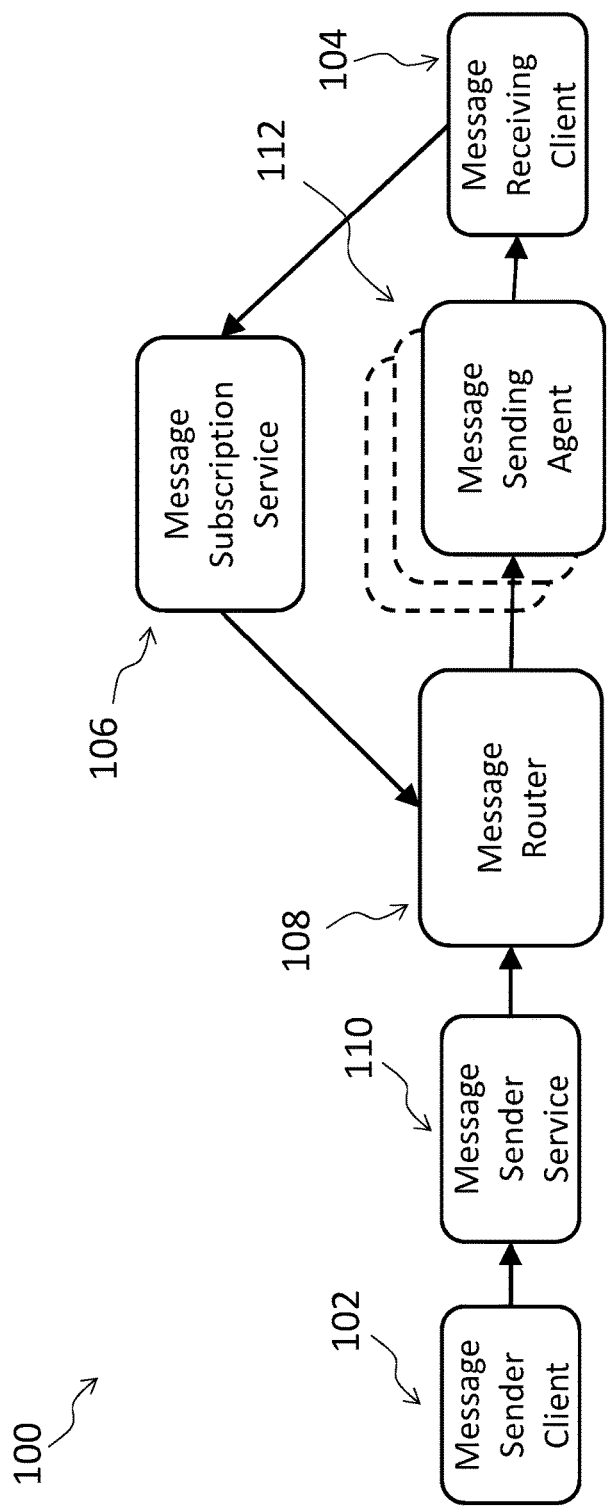
FIG. 1 illustrates a block diagram of an exemplary messaging service.

FIG. 1 illustrates a block diagram of an exemplary messaging service 100. Messaging service 100 includes elements which implement the various blocks depicted in FIG. 1. The messaging service 100 may be a service within an operating system, an application, a set of Application Programming Interfaces (APIs), or any other type of implementation that includes the system shown in FIG. 1.

Messaging service 100 directly or indirectly connects two or more messaging clients together. In one embodiment, a first device includes a message sender client 102. In some embodiments, the message sender client 102 is a device, program, set of APIs, set of instructions, or any other type of service for providing the functionality described below. The message sender client 102 may include a graphical user interface on a display of a first device. Examples of a message sender client 102 include an instant messaging application, a text messaging application (e.g., with short message service (SMS) capability), an email application, and a web browser-based messaging client. In some embodiments, multiple instances of the message sender client 102 run on one or more devices at one time.

The message sender client 102 may display entry fields for a message and for meta-data that a user can populate. Message content may include any content a user wishes to communicate across the messaging service 100. In some embodiments, the user is limited to entry of text or of ASCII characters. In other embodiments, a user is allowed to enter media such as emoticons, pictures, music, video, or other types of files. Meta-data fields may include message id, data/time, author/user, message type, message version, message tag/address, time-to-live, priority, or any other meta-data relevant to the message. As used throughout, reference to messages includes both messages alone and also messages that include meta-data.

In other embodiments of the message sender client 102, the meta-data is generated from contextual information related to the message (e.g., the user account associated with the message session, the date/time from the device or server, the geographical location of the device receiving the input, keywords from the message, etc.). In another embodiment, only the message is received at the message sender client 102 and meta-data is not associated with the message until after the message has left the message sender client 102 or the first device. In other embodiments, the message sender client 102 includes a user interface other than a graphical user interface. For example, the message sender client 102 may include an auditory user interface using a digital assistant on the device, such as the Siri™ digital assistant.

In some embodiments, the message sender client 102 provides a confirmation that the message content was received from the user. For embodiments with a graphical user interface, this confirmation can be in the form of displaying the message content in the graphical user interface. This embodiment may also include a record of content of previous messages. In some embodiments, the graphical user interface displays both sent content and received content, with the sent content and received content merged into a single stream. The merged sent content and received content may be differentiated in some embodiments by visual indicators such as coloring, shapes, or position of the messages. Alternatively, the messages may include a tag that identifies the message. The tag may be generated from one or more meta-data entries.

In an embodiment of the message sender client 102 that includes an auditory user interface, a confirmation of the message content received from the user is in the form of an audio playback of the message content, or a summary of the details of the message content, such as word counts, file size, recording length, or any other detail of the message content. Alternatively, the confirmation may be an audio playback of one or more entries of meta-data for the message.

In some embodiments, the message content received at the message sender client 102 propagates through the messaging service 100 to a message receiving client 104. In some embodiments, the message receiving client 104 is a device, program, set of APIs, set of instructions, or any other type of service for providing the functionality described below. The message receiving client 104 may be on a second device that is connected to the first device over a network connection. In one embodiment, the message receiving client 104 is identical to the message sender client 102. In another embodiment, the message receiving client 104 has a different user interface than the message sender client 102, but otherwise operates the same as the message sender client 102. In other embodiments, the message receiving client 104 has a different user interface and operates according to a different protocol than the message sender client 102. In some embodiments, the message receiving client 104 may be any of the clients described above with respect to the message sender client 102, such as an instant messaging application, a text messaging application, an email application, or a web browser-based messaging client. Notably, the message sender client 102 and the message receiving client 104 need not be the same type of client. For example, in one embodiment the message sender client 102 records in a text messaging application a text message entered on the first device as the message content and the message receiving client 104 of an email application displays an email including the message content at the second device. In some embodiments, multiple instances of the message receiving client 104 run on one or more devices at one time.

In some embodiments, the messages received at the message receiving client 104 are determined by channels of information to which the message receiving client 104 is subscribed. In some embodiments, a channel is defined by its source (e.g., network, workstation, message sender client) or the path along which it is provided. In some embodiments, a channel is defined by a certain characteristic (e.g., message topic, frequency band, etc.). For example, a channel may provide weather information. Furthermore, a channel can have a defined hierarchical relationship in which each level of the hierarchy has a narrower scope than the preceding level. For example, the weather channel may have a hierarchical relationship based on location, such as Country/State/City.

A message provided on a channel can include a characteristic, also referred to herein as a message parameter, that may be used to identify and/or filter the message based on specified message criteria. Non-limiting examples of a message parameter include the content of a message (e.g., subject, text, image, etc.), meta-data associated with a message (e.g., channel, time/date, sender, format, message id, author/user, message type, message version, message tag/address, time-to-live, priority, or any other meta-data relevant to the message), or other characteristic of a message. For example, a message parameter may include one or more of a channel identifier that identifies the channel associated with the message, a sender identifier that identifies the sender of the message (e.g., a username, machine ID, etc.), an event identifier that identifies an event associated with the message (e.g., an event that triggered the generation of the message, such as a file being edited, created, or deleted), a message type (e.g., email, SMS text message, etc.), a message tag (e.g., a keyword), and a message address (e.g., an IP address).

Message criteria may include a specific value of a message parameter. For example, message criteria may include a particular channel or a specific author/user identifier that is used to filter the messages on the particular channel such that only messages generated by that specific author/user are sent to and/or received by a particular message receiving client 104. In another example, a channel includes messages in which the content of the message includes specific key words, like "Project XYZ." In this example, messages are sent to a specific message receiving client 104 that has requested to receive messages based on message criteria that is met if the message content includes the keyword "Project XYZ." Messages can be filtered by a single criterion (e.g., author) or multiple criteria (e.g., author and keyword). In yet another example, in the weather channel example above, the message criteria may specify a specific country, state, and/or city. In these ways, message criteria may be used to effectively define a new channel (e.g., a sub-channel) to which the particular message receiving client 104 is subscribed.

Subscriptions to particular content (e.g., channels and/or messages with specified message parameters) can be administered by a message subscription service 106. The message subscription service 106 may include a device, program, set of APIs, set of instructions, or any other type of service for providing the functionality described below. In one embodiment, the message subscription service 106 is a Spring Boot REST service. The message subscription service 106 may operate on the second device that is running the message receiving client 104. In another embodiment, the message subscription service 106 operates on a network-connected server. In yet another embodiment, the message subscription service 106 operates on a separate network-connected device. In some embodiments, multiple instances of the message subscription service 106 run on one or more devices at one time.

In one embodiment, the message receiving client 104 receives a message subscription service request from a user. The message receiving client 104 transmits the message subscription service request to the message subscription service 106. In another embodiment, the message subscription service 106 receives a message subscription service request from the message sender client 102. In yet another embodiment, the message subscription service request is generated by a device other than the message sender client 102 and the message receiving client 104. The device communicating the message subscription service request need not be contained within the messaging service 100. To this end, message subscription service requests may be generated by the user requesting to receive the messages, the user sending the messages, or some other user, such as a user who acts as an administrator by establishing a communications path between the sending user and the receiving user.

In some embodiments, message subscription service requests identify a message receiving client 104 to which messages are to be sent. The message subscription service request may also include message criteria, as described above, that has at least one message criterion that is used to identify and/or filter messages to be sent to the identified message receiving client 104. In some embodiments, the message subscription service request is used to subscribe to more than one channel and/or sub-channel. The message subscription service request may also identify more than one recipient for messages with message parameters that match specified message criteria. Message subscription service requests may also include an identifier that can be used to associate the message receiving client 104 with a channel or message. If the message receiving client 104 is not already associated with a specified channel, for example, then the message subscription service 106 associates the identifier for the message receiving client 104 with the specified channel.

Messaging service 100 also includes a message router 108. The message router 108 may include a device, program, set of APIs, set of instructions, or any other type of service for providing the functionality described below. In one embodiment, the message router 108 is a high-concurrency message routing system provided by, e.g., Akka. In some embodiments, the message router 108 is operated on a server on a network. In other embodiments, the message router 108 is operated on a device not operated on the network, and instead the messages are sent off the network to an external message router 108. In other embodiments, the message router 108 is maintained on the first device operating the message sender client 102 or on the second device operating the message receiving client 104. In some embodiments, multiple instances of the message router 108 run on one or more devices at one time.

The message router 108 receives messages from a message sender service 110. The message sender service 110 may include a device, program, set of APIs, set of instructions, or any other type of service for providing the functionality described below. In one embodiment, the message sender service 110 is a Spring Boot REST service. The message sender service 110 may operate on the device that is running the message sender client 102. In another embodiment, the message sender service 110 operates on a network-connected server. In yet another embodiment, the message sender service 110 operates on a separate network-connected device. In some embodiments, multiple instances of the message sender service 110 run on one or more devices at one time.

The message sender service 110 includes a service that collects messages from the message sender client 102 and transmits the messages to the message router 108. The message sender service 110 collects inputs provided by the user (e.g., via a user interface provided by the message client 102), such as message content. In some embodiments, the message sender service 110 collects message meta-data. Message meta-data may be input by the user or generated by the message sender client 102 based on contextual data captured by the message sender client 102, such as time, location, or user account that may be ascertained from the device running the message sender client 102, from values maintained by the message sender service 110, or a server communicating with the message sender service 110. In one embodiment, the message sender service 110 can add additional message meta-data to the message collected from the message sender client 102.

The message sender service 110 takes the collected message, including the message content and the message meta-data, and sends it to the message router 108. To send the message to the message router 108, the message sender service 110 may package the message based on a network protocol to route the message across a network. The network may be wired or wireless (or a combination of wired and wireless), local or wide area (or a combination of local and wide area), private or public (or a combination of private and public). In some embodiments, the network includes the World Wide Web.

The message is received at the message router 108. In some embodiments, a packaged message is unpackaged at the message router 108. In some embodiments, the packaged message is unpackaged prior to arriving at the message router 108. The message router 108 may analyze the unpackaged message by comparing the message parameter(s) against message criteria specified in subscription service requests. When the message router 108 matches a message parameter to the message criteria for a subscription service request, the message router 108 sends the matching message according to the identifier(s) associated with that subscription service request (which specify, e.g., a message receiving client, message sending agent, and/or communication type). In some embodiments, the identifier(s) associated with that subscription service request are associated with the matching channel and/or message.

A message may have a message parameter that matches the message criteria of more than one subscription service request, in which case the message router 108 associates the message to the plurality of subscription service requests having matching criteria. In some embodiments, the message router 108 makes a copy of the message and transmits the copy of the message according to the identifier(s) associated with that subscription service request as soon as a matching subscription service request is identified. In another embodiment, the message router 108 completes a query of the channels to collect identifiers associated with the channel and then transmits the messages of that channel, or copies of the messages, according to the identifiers.

The message router 108 uses message sending agent 112 to send messages with a message parameter matching the message criteria in a subscription service request to the message receiving client 104 specified in the subscription service request. The message sending agent 112 may be one or more devices, programs, sets of APIs, sets of instructions, or any other type of services for providing the functionality described below. In some embodiments, the message sending agent 112 operates on the same device as the message router 108. In other embodiments, the message sending agent 112 operates on a separate network-connected device. In some embodiments, multiple instances of the message sending agent 112 run on one or more devices at one time.

The message sending agent 112 includes one or more services that collect messages and message identifiers from the message router 108 and transmit the messages to the corresponding message receiving client 104. In some embodiments, the message router 108 also sends the message meta-data to the message sending agent 112 along with the message and the identifier. To send the messages to the proper message receiving client 104, the message sending agent 112 may package the messages based on a network protocol to route the messages across a network. The network may be wired or wireless (or a combination of wired and wireless), local or wide area (or a combination of local and wide area), private or public (or a combination of private and public). In some embodiments, the network includes the World Wide Web. The message sending agent 112 may forward messages from the message router 108 to the corresponding message receiving client 104 by sending either the message or a copy of the message across the network.

The message sending agent 112 sends messages to the proper message receiving client 104 based on the identifier (s) included with the messages. In some embodiments, there is only a single message sending agent 112. In other embodiments, there is a plurality of message sending agents 112. Any specific message is received by one, some, or all of the one or more message sending agents 112. In one embodiment, a particular message sending agent 112 is individualized to a specific mode of communication. In some embodiments, the message sending agent 112 can send messages to a plurality of message receiving clients over that specific mode of communication. Specific modes of communication include, but are not limited to, email, text messages (e.g., SMS messages), websocket, webhook, and RSS.

In one example, the message sending agent 112 includes a message sending agent 112 configured to send an email ("email message sending agent"). In one example, a message subscription service request is received at the message subscription service 106. The message subscription service request includes message criteria that specify a first channel and a specific event (e.g., "event 1"). The messaging service 100 routes all messages on the first channel with a message parameter indicating the specific event (e.g., a tag designating "event 1") to a message receiving client 104 based on an identifier of a message receiving client identified in the message subscription service request. The identifier may indicate a specific user account associated with a receiving agent that is to receive the messages. This exemplary message subscription service request also indicates email as the mode of communication. In this example, the message sender client 102 then receives a message (e.g., a text message, such as an SMS message, or a message with system-specific protocol) from a first device that includes the specific event criterion (e.g., the message is tagged as "event 1"). The message is collected at the message sender client 102 and passed to the message sender service 110 on the first device. The message sender service 110 transmits the message over a network from the first device to the message router 108. The message router 108 compares the message parameter to the criteria of the subscription service request and matches the message to the subscription. The message router 108 then associates the message with the identifier from the subscription service request and sends the message and the identifier to the email message sending agent 112. The email message sending agent 112 converts the message to an email format and then sends the email to the message receiving client 104 on the second device. The message receiving client 104 receives the message and displays the email message in the message receiving client 104 on a display of the second device.

In some embodiments, the above example includes a second message sending agent 112 configured to send text messages ("text message sending agent"). In this example, a second message subscription service request is received at the message subscription service 106, which specifies second message criteria for a second channel and a second specific event (e.g., "event 2"). The second message subscription service request also includes an identifier that the message receiving agent 104 is to receive the messages. The second message subscription service request also identifies "text message" as the mode of communication (e.g., as part of the identifier). In this example, the message sender client 102 receives a second message. The second message is collected at the message sender client 102 and passed to the message sender service 110. The message sender service 110 transmits the second message over the network to the message router 108. The message router 108 identifies the message as being associated with the second channel. The message router 108 determines that the second message meets the message criteria of the second subscription service request (e.g., second channel and "event 2"). The message router 108 then associates the second message with the identifier from the second subscription service request and sends the second message and the identifier to the text message sending agent 112. If necessary, the text message sending agent 112 converts the message to a text message format (e.g., SMS) and then sends the text message to the message receiving client 104. The message receiving client 104 receives the message and displays the text message in the message receiving client 104 on a display of the second device.

In other embodiments of the above example, the second message also meets the criteria of the first subscription service request (e.g., the second message is also on the first channel and includes metadata that associates it with "event 1" and "event 2"). In this embodiment, the second message is also routed to the email message sending agent 112, as specified by the first message subscription request. In these embodiments, an email message of the second message is received at the message receiving client 104, in accordance with the first subscription request, and a text message of the second message is received at the message receiving client 104, in accordance with the second subscription request.

The above examples illustrate that the messaging service 100 is capable of receiving a message in a particular format (e.g., text message) and providing the message receiving client 104 with the message in multiple formats or modes of communication (e.g., email and text message), as specified in the message subscription requests.

Security may be implemented at multiple points within the messaging service 100. One method of providing security for the system is to associate users with entitlements that limit their access to data within the network. An example is to maintain a database that associates users with specific channel permissions. In one embodiment, a user is prevented from submitting a message subscription service request for data to which they do not have entitlements. In another embodiment, a check is performed after a message subscription service request is received to see if it violates any entitlements. Any invalid requests are then rejected. In another embodiment, the subscription service requests are checked at a later time to ensure that they do not violate any entitlement rules that have been enacted or changes since the request was received. A subscription service request that violates entitlement rules can then be deleted. Subsequent checks may be performed periodically. These checks may be performed at a predetermined time, at a predetermined interval of the number of messages processed at the message router 108, or at some other interval.

Figure 2:
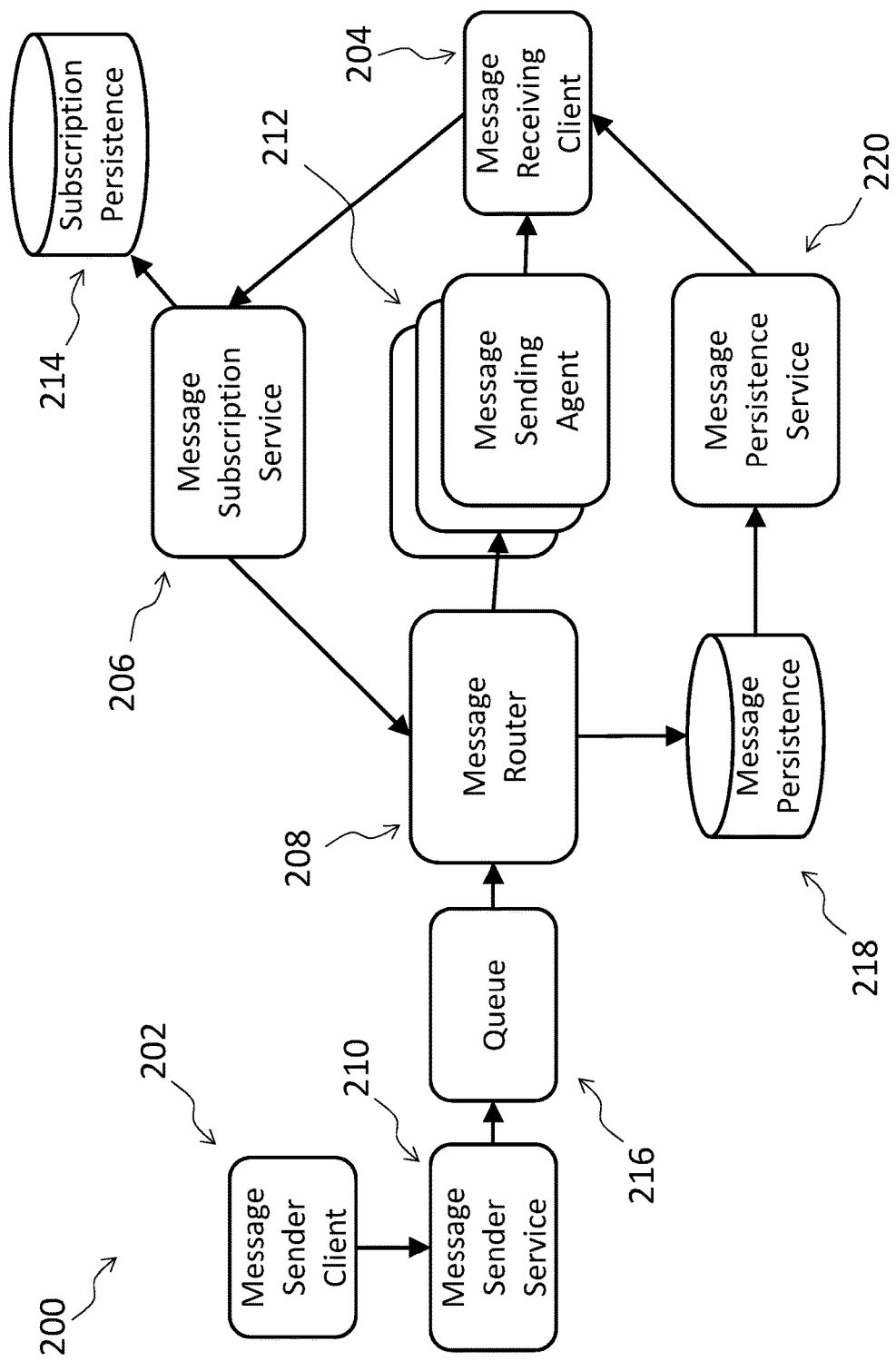
FIG. 2 illustrates a block diagram of another exemplary messaging service.

FIG. 2 illustrates a block diagram of another embodiment of a messaging service. Messaging service 200 includes a number of components similar to the components described with respect to messaging service 100. For example, message sender client 202, message receiving client 204, message subscription service 206, message router 208, message sender service 210, and message sending agent 212 may be as described with respect to messaging service 100.

In addition, messaging service 200 includes a subscription persistence 214. The subscription persistence 214 may be a distributed database management system and/or data store, such as a Cassandra data store used to provide persistent storage. In one embodiment, the subscription persistence 214 stores data in non-volatile memory. The subscription persistence 214 may operate on the same device that is running the message subscription service 206. In another embodiment, the subscription persistence 214 operates on a separate network-connected device. In some embodiments, multiple instances of the subscription persistence 214 run on one or more devices at one time.

In one embodiment, the subscription persistence 214 is connected to the message subscription service 206. The subscription persistence 214 receives message subscription service requests from the message subscription service 206 and stores the received message subscription service requests. In alternate embodiments, the subscription persistence 214 receives subscription service request information generated by the message subscription service 206. The information stored by the subscription persistence 214 may be stored in any number of configurations. In some embodiments, the subscription persistence 214 stores information based on when it is received at the subscription persistence 214. In other embodiments, the subscription persistence 214 stores information by grouping like information (e.g., grouping the message subscription service requests that have identical parameters or grouping similar subscription requests together).

In some embodiments, the subscription persistence 214 can be queried by the message subscription service 206. In other embodiments, the subscription persistence 214 can be queried by the message receiving client 204. In yet another embodiment, the subscription persistence 214 can be queried by any approved device, such as devices on the network or with user authentication. The subscription persistence 214 may be used to determine what message subscription service requests have been made without having to task the message subscription service 206 with running a query. Queries may be made based on any number of fields, such as for specific users, channels, date/time, or the like. Also, the subscription persistence 214 may be used to restore message subscription service requests after loss by the message subscription service 206 and/or the message router 208, such as from power cycling or from system failure, for example.

Messaging service 200 also includes a queue 216. The queue 216 may be one or more devices, programs, sets of APIs, sets of instructions, or any other type of services for providing the functionality described below. In one embodiment, the queue 216 is a Kafka messaging broker provided by Apache. The queue 216 may operate on the same device that is running the message router 208. In yet another embodiment, the queue 216 operates on a separate network-connected device. In some embodiments, multiple instances of the queue 216 run on one or more devices at one time.

The queue 216 receives messages from the message sender service 210 and sends the received messages to the message router 208. In these embodiments, the queue 216 acts as a message buffer to prevent the message router 208 from being overloaded by too many messages from message sender service 210. In one embodiment, the queue 216 is a simple first-in first-out buffer. In other embodiments, the queue 216 can implement a prioritization scheme to send messages to the message router 208 in an order other than the order received at the queue 216. In some embodiments, the message queue 216 sends messages to the message router 208 at a set time interval. In another embodiment, the queue 216 sends messages to the message router 208 after receiving a notification from the message router 208 that it is ready to accept a message.

Messaging service 200 also includes a message persistence 218. The message persistence 218 may be a data store, such as a Cassandra data store used to provide persistent storage. In one embodiment, the message persistence 218 stores data in non-volatile memory. The message persistence 218 may operate on the same device that is running the subscription persistence 214. In another embodiment, the message persistence 218 operates on the same device as the message router 208. In yet another embodiment, the message persistence 218 operates on a separate network-connected device. In some embodiments, multiple instances of the message persistence 218 run on one or more devices at one time.

In one embodiment, the message persistence 218 is connected to the message router 208. The message persistence 218 receives messages forwarded by the message router 208 and stores the received messages. In one embodiment, the message persistence 218 receives all messages received by the message router 208. In other embodiments, the message router 208 only sends a portion of the messages it receives to the message persistence 218. In one embodiment, only messages from particular channels are sent to the message persistence 218. In some embodiments, a message subscription service request includes an instruction to send messages with a message parameter that matches the message criteria of the request to the message persistence 218 (e.g., in addition to or instead of a designated message receiving client).

The messages stored by the message persistence 218 may be stored in any number of configurations. In some embodiments, the message persistence 218 stores the messages based on when the messages are received at the message persistence 218. In other embodiments, the message persistence 218 stores messages by grouping like messages, such as grouping the messages that have identical meta-data, or grouping messages together that are associated with the same or related channels.

In some embodiments, the message persistence 218 can be queried by the message receiving client 204. In other embodiments, the message persistence 218 can be queried by any approved device, such as devices on the network or with user authentication. The message persistence 218 may be used to review records of messages sent to the message persistence 218. Queries may be made based on any number of message parameters (e.g., fields, such as for specific users, channels, date/time, etc.). Also, the subscription persistence 214 may be used to restore a record of messages received at a message receiving client 204 after loss by the message receiving client, such as from power cycling or from system failure, for example.

The message persistence 218 outputs messages it has stored in response to a request, query, or other instruction. The instruction to output messages may include a one-time instruction to output messages that match a query; a persistent instruction to continually output messages that match a query as they arrive; a persistent instruction to output all messages; or some other instruction. The instruction to output messages may include one or more criteria to match against any of the message parameters of the messages in the message persistence 218. In some embodiments, the criteria include specified message content. In other embodiments, the criteria include a value of message meta-data (e.g., time/date, sender, format, etc.). For example, criteria may include a specific author/user. In another example, the criteria require key words in the message content, like "Project XYZ."

In one embodiment, messages output from the message persistence 218 are sent to a message persistence service 220. The message persistence service 220 may include a device, program, set of APIs, set of instructions, or any other type of service for providing the functionality described below. In one embodiment the message persistence service 220 is a Spring Boot REST service. The message persistence service 220 may operate on the same device that is running the message persistence 218. In another embodiment the message persistence service 220 operates on a separate network-connected device. In some embodiments, multiple instances of the message persistence service 220 run on one or more devices at one time.

The message persistence service 220 collects messages from the message persistence 218 and transmits the messages to the corresponding message receiving client 204. In some embodiments, the message persistence 218 also sends the message meta-data and any identifiers associated with the message (e.g., from subscription service requests, which may identify, e.g., a message receiving client and/or communication type) to the message persistence service 220 along with the message. To send the matching messages to the message receiving client 204, the message persistence service 220 may package the matching messages based on a network protocol to route the matching messages across a network. The network may be wired or wireless (or a combination of wired and wireless), local or wide area (or a combination of local and wide area), private or public (or a combination of private and public). In some embodiments, the network includes the World Wide Web. The message persistence service 220 may forward messages from the message persistence 218 to the corresponding message receiving client 204 by sending either the message or a copy of the message across the network. The message persistence service 220 may send the message output from the message persistence 218 to the message receiving client 204 using a specific mode of communication such as email, text messages, websocket, webhook, RSS, or some other mode of communication.

Figure 3:
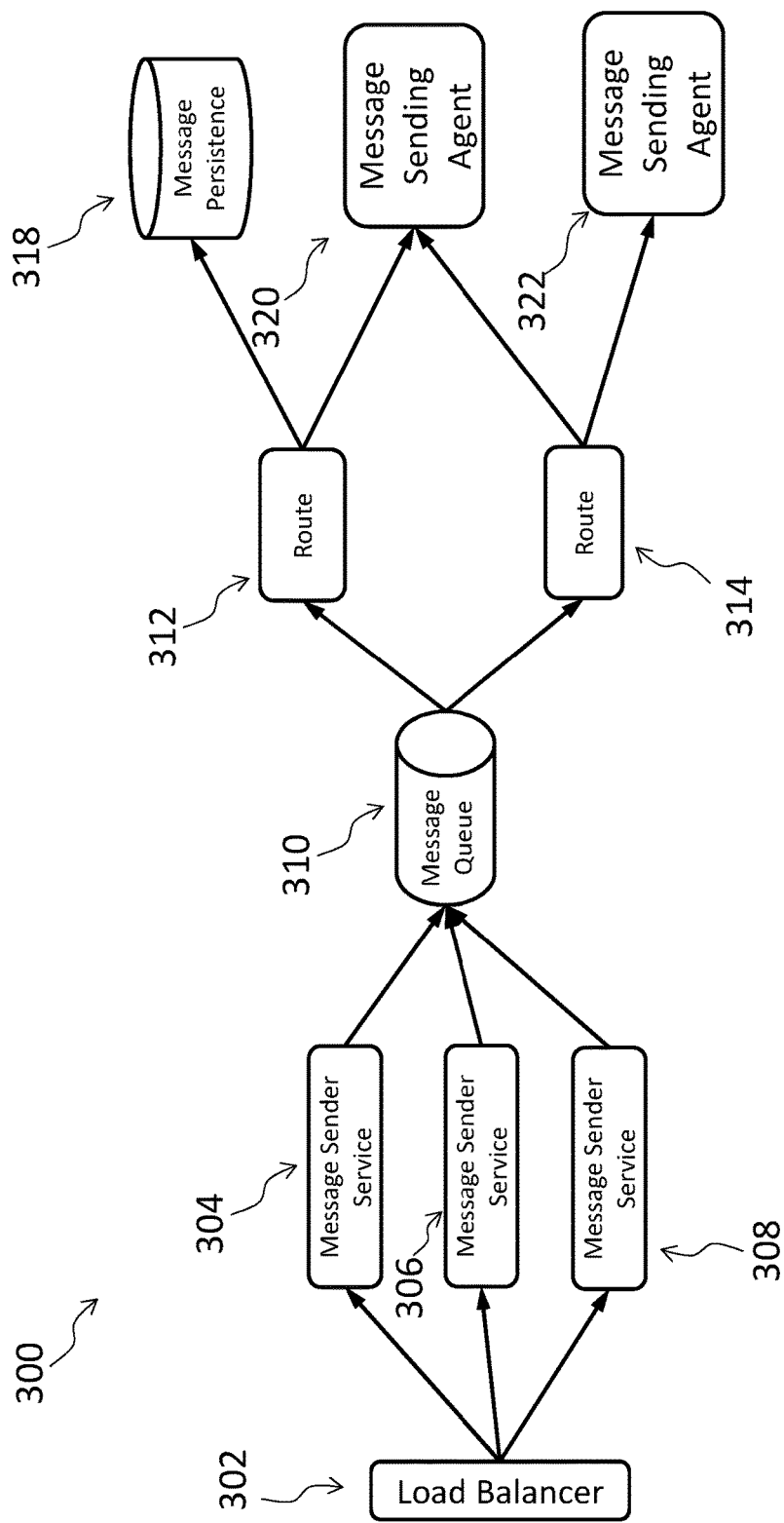
FIG. 3 illustrates a functional diagram of an exemplary messaging service.

FIG. 3 illustrates a functional diagram of an exemplary messaging service. A messaging service 300 includes functional elements which implement the various blocks depicted in FIG. 3. The messaging service 300 may be a service within an operating system, an application, a set of APIs, or any other type of implementation that includes the functions shown in FIG. 3.

The messaging service 300 begins with a load balancer 302. The load balancer 302 may be a REST proxy, websocket proxy, or any other implementation that provides the below functionality. In one embodiment the load balancer 302 is a NGINX load balancer.

The load balancer 302 distributes incoming data among a plurality of services configured to process the data. As incoming data may come in at a faster rate than any single service can process it, the load balancer distributes the work of processing the incoming data across multiple services. In one embodiment, the multiple services are on the same device. In another embodiment, the multiple services are on different devices on the same network. And in another embodiment the multiple services are on different devices on different networks.

The load balancer 302 may receive data from a number of sources. In one embodiment the load balancer 302 receives messages from the message sender client 102. In another embodiment, the load balancer 302 receives messages from a plurality of message sender clients.

The load balancer 302 balances the load on the message sender services 304, 306, and 308. As the load balancer 302 receives messages from the plurality of message sender clients, the load balancer distributes the messages to the message sender services 304, 306, and 308. The load balancer 302 may use any one of many different algorithms to distribute the messages to message sender services 304, 306, and 308. In one embodiment, the load balancer 302 allocates a first message to a first message sender service 304, a second message to the second message sender service 306, and a third message to the third message sender service 308. Then the load balancer 302 repeats the cycle by sending a fourth message to the first message sender service 304. Another embodiment has the load balancer 302 monitoring its distribution of messages and calculating a prediction for the load on the message sender services 304, 306, and 308. In another embodiment, the load balancer 302 gets status reports from the message sender services 304, 306, and 308. The load balancer 302 then ascertains the optimal message sender service to forward a message to, such as the message sender service that has been idle the longest or the message sender service that is finishing soonest. The load balancer 302 may distribute messages in the order that they arrive, or may instead prioritize received messages based on some criteria and distribute the messages in an order different than the order that they arrive.

The message sender services 304, 306, and 308 process the messages received from load balancer 302. In some embodiments, the message sender services 304, 306, and 308 are the same or similar to the message sender service 110. In other embodiments, the message sender services 304, 306, and 308 are different from the message sender service 110.

The message sender services 304, 306, and 308 send processed messages to the message queue 310. In some embodiments, the message queue 310 is the same or similar to the message queue 216. In other embodiments, the message queue 310 is different from the message queue 216.

Messages are buffered in the message queue 310 and then routed according to message channels and/or message subscription service requests. In some embodiments, the message channels are the same or similar to the message channels discussed above with respect to FIG. 1. The channels and subscription service requests are used by the message router to provide the direction for sending messages to a specific target over a specific mode of communication. The subscription service requests are not limited to a single message criterion, rather many criteria can be combined to be the basis for routing a message, as described above. When a message is identified as a match to a subscription service request, the message is routed over route 312 or 314 by a message router. In one embodiment, the message router is the same or similar to the message router 108. In other embodiments, the message router is different from the message router 108.

In the embodiment shown in FIG. 3, route 312 directs messages of a first channel that match criteria established for storing a message to a message persistence 318. In some embodiments, the message persistence 318 is the same or similar to the message persistence 218. In other embodiments, the message persistence 318 is different from the message persistence 218. Similarly, route 312 also directs messages of the first channel that match the criteria of a first subscription service request to a message sending agent 320. In this example, messaging service 300 can send the same message to both message persistence 318 and message sending agent 320 via route 312. In some embodiments, the message sending agent 320 is the same or similar to the message sending agent 112. In other embodiments, the message sending agent 320 is different from the message sending agent 112. In some embodiments, message sending agent 320 manages sending of the messages for transmission across the World Wide Web.

In the embodiment illustrated in FIG. 3, route 314 directs messages of a second channel that match the criteria of a second subscription service request to the message sending agent 320 and to a second sending agent 322. This shows that messaging service 300 can send the same message to two different message sending agents. In some embodiments, the message sending agent 322 is the same or similar to the message sending agent 320. In other embodiments, the message sending agent 322 is the same or similar to the message sending agent 112. In yet another embodiment, the message sending agent 322 is different from the message sending agent 112 and message sending agent 320.

Figure 4:
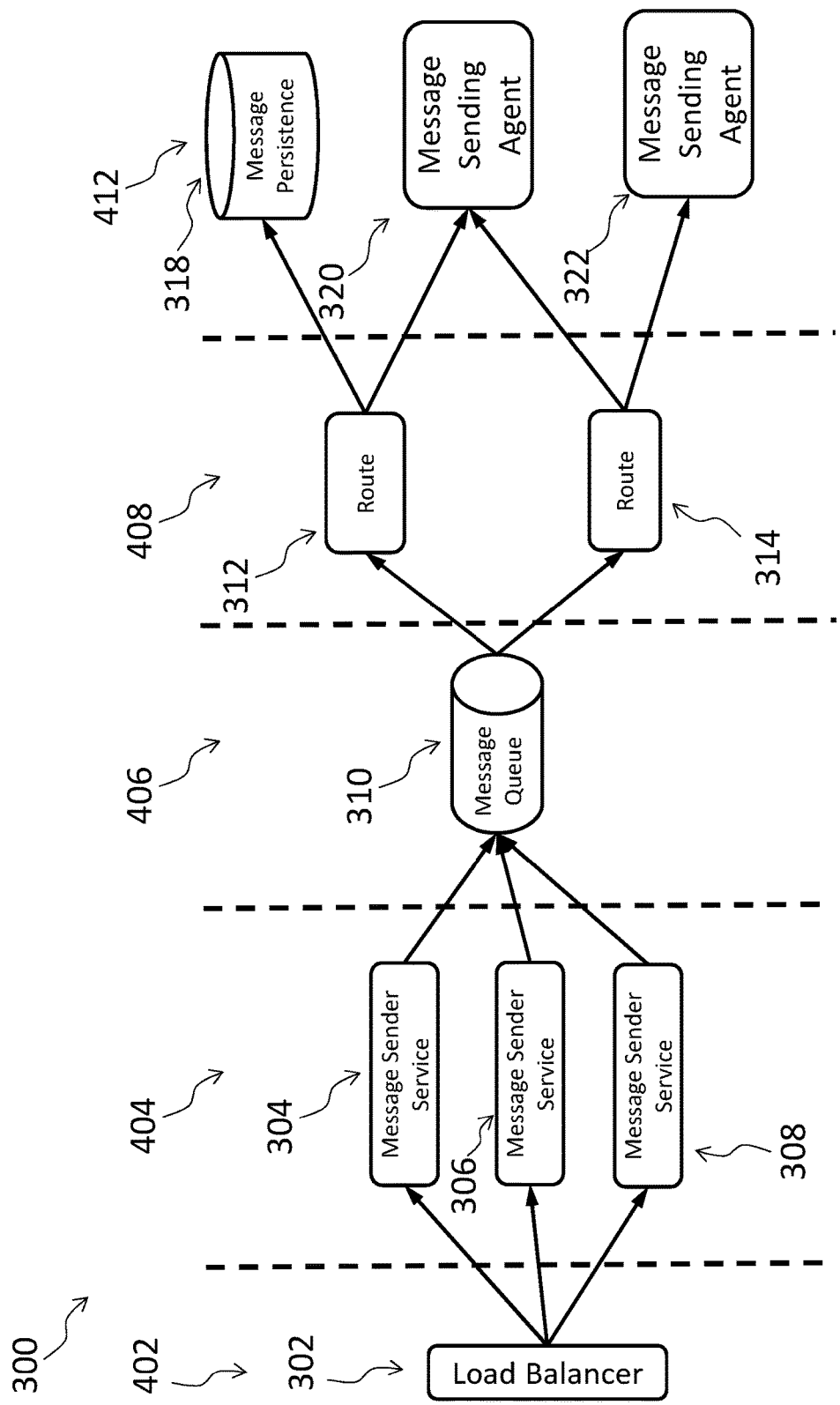
FIG. 4 illustrates a functional diagram of another exemplary messaging service.

FIG. 4 illustrates scalable components of a functional diagram of an exemplary messaging service. FIG. 4 depicts the messaging system 300 shown in FIG. 3, with the different elements compartmentalized, or segmented, into five distinct stages. The first stage 402 represents the initial load balancing done by the load balancer 302. The second stage includes the message sender services 304, 306, and 308. The third stage includes the message queue 310. The fourth stage includes the routes 312 and 314. And the fifth stage includes the message persistence 318, the message sending agent 320, and the message sending agent 322.

The different stages of the messaging system 300 are identified to illustrate their independent scalability. For example, if the second stage 404 is being overwhelmed with incoming data traffic, a new message sender service may be instantiated to prevent bottlenecking in the system. Similarly, if the fourth stage 408 is undertasked, hardware or software resources can be allocated away from the fourth stage 408 without affecting the performance of any other stage. In some embodiments, the stages shown in FIG. 4 can be scaled up or down independent of any other stage, for any reason, including amount of traffic.

Figure 5:
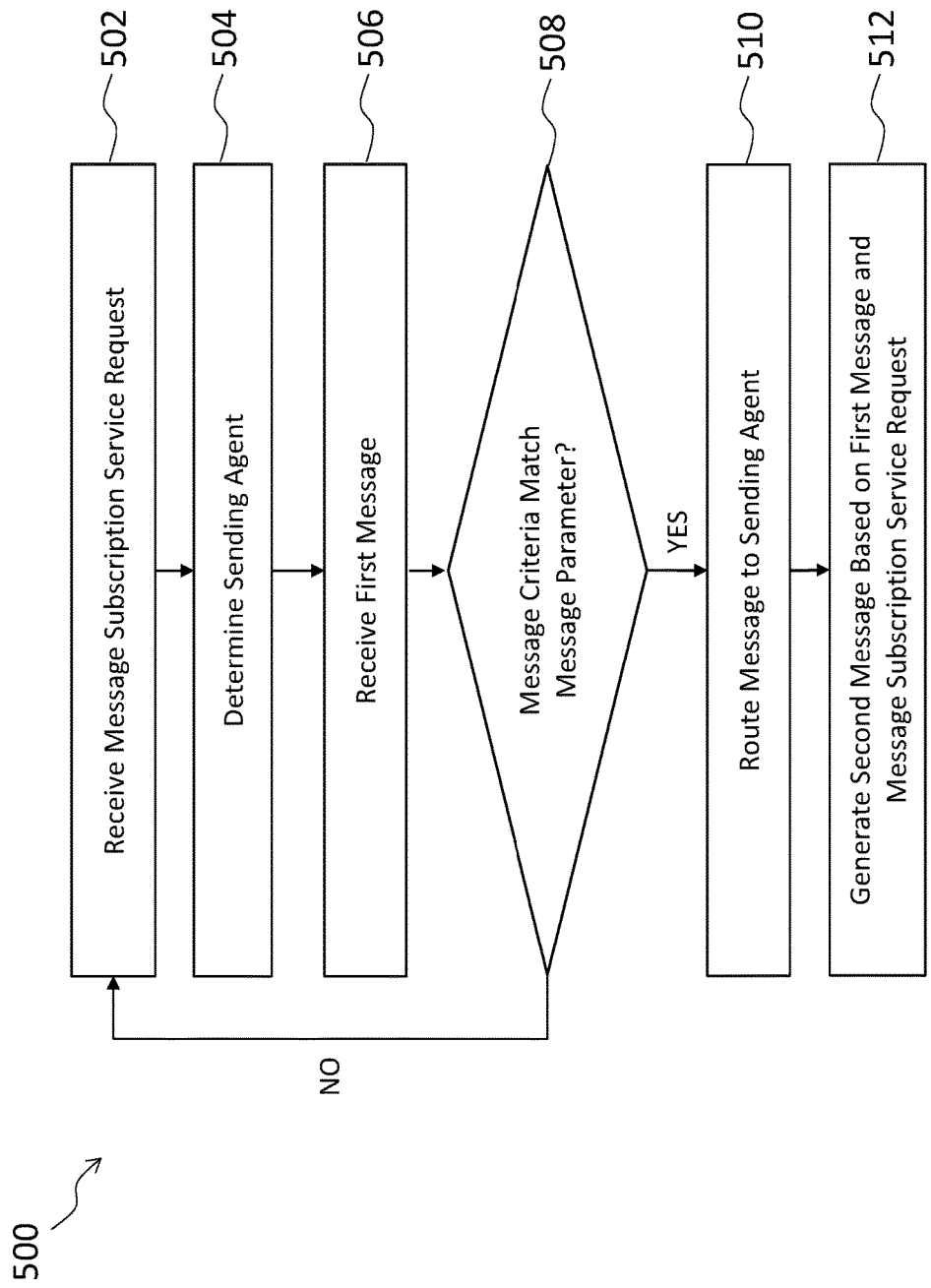
FIG. 5 illustrates a flowchart of an exemplary process for providing a messaging service.

FIG. 5 illustrates a flowchart of an exemplary process for providing a messaging service. The process 500 includes block 502 in which a message subscription service request is received (e.g., at a router). The message subscription service request may include message criteria. In some embodiments, the router is the same or similar to the message router 108. The router may also include a message subscription service that is the same or similar to the message subscription service 106.

In block 504, a sending agent is determined. The sending agent may be determiend based on the subscription service request. In some embodiments, the router makes this determination after receiving the subscription service request. In other embodiments, the router determines the sending agent based on the subscription service request (e.g., based on a mode of communication or format specified in the request). In yet another embodiment, the router is not responsible for determining a sending agent. The sending agent may be the same or similar to the sending agent 112. In one embodiment, a sending agent is determined by matching a mode of communication to a sending agent configured to send messages over that mode of communication. In other embodiments, the sending agent is also selected based on other criteria in addition to the subscription service request (e.g., the size of a message, the destination of the message, the load on sending agents in the system, etc.). In some embodiments, the determination is made by identifying one or more sending agents from a plurality of sending agents.

In block 506, a message is received (e.g., at the router). The message may include a message parameter. The message may be received from any number of sources. In some embodiments, the message is received from a message sender service (e.g., 110) or a queue (e.g., 216). In other embodiments, the message is received from a source other than a message sender service or a queue.

In block 508, a determination is made whether the message criteria match the message parameter. The determination may be a comparison of any of the characteristics or parameters of the message represented by the message parameter to particular values of those characteristics or parameters specified by the message criteria. In one embodiment, this determination is made at the router. In some embodiments, a message parameter may match the message criteria of more than one subscription service request.

In exemplary process 500 illustrated in FIG. 5, if it is determined that the message criteria do not match the message parameter, process 500 returns to block 502. In other embodiments, a process may end if it is determined that the message criteria do not match the message parameter.

Alternatively, if it is determined that the message criteria match the message parameter, process 500 moves to block 510. In block 510, in response to a determination that the message criteria match the message parameter, the message is routed to the sending agent.

In block 512, a second message is generated (e.g., at the sending agent) based on the first message and the message subscription request.

In some embodiments, the message is also associated with the message subscription service request based on the determination that the message criteria match the message parameter. In some embodiments, the message is associated with the message subscription service request by appending to the message an identifier from the message subscription service request, the message meta-data, and/or any message packaging used for transmission. In some embodiments, the identifier indicates the recipient of the message (e.g., a message receiving agent and/or user account associated with a message receiving agent) and/or a particular format or mode of communication by which the message is to be sent.

With respect to routing the message to the sending agent, in some embodiments, the message is routed to the sending agent by reading the identifier associated with the message (which identifies, e.g., a particular format or mode of communication) and correlating the identifier with a sending agent. Then the message is routed to the sending agent designated to handle the messages. In one embodiment, the message is copied or forwarded to the sending agent. The routing of the message is handled by the router in some embodiments.

With respect to generating the second message at the sending agent, in one embodiment, the sending agent is configured to convert a received message into a second message with the same message content. The conversion process may be a repackaging of the message for a different mode of communication. The message subscription request controls which mode of communication is to be used to send the message, and thus which sending agent receives the message for conversion. For example, the first message may be converted from whatever format in which it is received to an email or text message as the second message.

Various exemplary embodiments are described herein. Reference is made to these examples in a non-limiting sense. They are provided to more broadly illustrate applicable aspects of the disclosed technology. Various changes may be made and equivalents may be substituted without departing from the true spirit and scope of the various embodiments. In addition, many modifications may be made to adapt a particular situation, material, composition of matter, process, process act(s), or step(s) to the objective(s), spirit, or scope of the various embodiments. Further, as will be appreciated by those with skill in the art, the individual variations described and illustrated herein have discrete components and features that may be readily separated from or combined with the features of any of the other several embodiments without departing from the scope or spirit of the various embodiments.

We claim:

1. A computer-implemented method for a messaging service, the method comprising:
    receiving a first message subscription service request at a router, the first message subscription service request including message criteria;
    receiving a second message subscription service request at the router, the second message subscription service request including the message criteria;
    determining a first sending agent based on the first message subscription service request;
    determining a second sending agent based on the second message subscription service request, wherein the first sending agent and the second sending agent are associated with different respective modes of communication;
    receiving a first message at the router, the first message including a message parameter and message content;
    determining whether the message criteria match the message parameter; and
    in response to a determination that the message criteria match the message parameter:
        routing the first message to the determined first sending agent;
        generating a second message at the first sending agent based on the first message and the first message subscription service request, wherein the second message includes the message content;
        routing the first message to the determined second sending agent; and
        generating a third message at the second sending agent based on the first message and the second message subscription service request, wherein the third message includes the message content, and wherein the second message and the third message are sent via different modes of communication.

2. The computer-implemented method of claim 1, wherein determining the first sending agent includes determining the first sending agent from a plurality of sending agents, wherein the first sending agent is at least one of an email-generating sending agent, a text-generating sending agent, a websocket-generating sending agent, and a webhook-generating sending agent, and
wherein determining the second sending agent includes determining the second sending agent from the plurality of sending agents, wherein the second sending agent is at least one of an email-generating sending agent, a text-generating sending agent, a websocket-generating sending agent, and a webhook-generating sending agent.

3. The computer-implemented method of claim 1, further comprising:
receiving a third message subscription service request at the router, the third message subscription service request including second message criteria;
receiving a fourth message at the router, the fourth message including a second message parameter;
determining whether the second message criteria match the second message parameter; and
in response to a determination that the second message criteria match the second message parameter:
routing the fourth message to the sending agent; and
generating a fifth message at the sending agent based on the fourth message and the second message subscription service request.

4. The computer-implemented method of claim 1, further comprising:
routing the first message to a persistent store including a distributed database management system; and
saving the first message in the persistent store.

5. The computer-implemented method of claim 4, further comprising:
receiving a request for the first message stored in the persistent store;
retrieving the first message from the persistent store; and
sending the first message to a message persistence service based on the request.

6. The computer-implemented method of claim 4, wherein routing the first message to the persistent store is based on determining that the message criteria match the message parameter.

7. The computer-implemented method of claim 1, wherein the first message is received from a message sender service.

8. The computer-implemented method of claim 7, further comprising:
detecting increased traffic at the message sender service; and
generating a second instance of the message sender service.

9. The computer-implemented method of claim 7, further comprising:
buffering the first message at a message queue before sending to the router.

10. The computer-implemented method of claim 7, further comprising:
detecting increased traffic at the message queue; and
generating a second instance of the message queue.

11. The computer-implemented method of claim 1, further comprising:

receiving a sixth message at the router, wherein the order of receipt of the first and sixth messages at the router is determined by a Representational State Transfer (REST) proxy load balancer.

12. The computer-implemented method of claim 1, wherein the message parameter includes at least one of a channel identifier, a sender identifier, an event identifier, a message type, a message tag, a message address, and message content.

13. The computer-implemented method of claim 1, further comprising:
filtering messages between the router and at least one of the sending agents based on entitlements.

14. The computer-implemented method of claim 13, wherein the entitlements are entries in a database that correlate a user with specific message parameter permissions.

15. The computer-implemented method of claim 1, further comprising:
evaluating the message subscription service request based on entitlements, and
rejecting the message subscription service request before generating a message subscription if the message subscription service request fails the evaluation.

16. The computer-implemented method of claim 1, wherein generating the third message comprises converting the first message having the message content into the third message having the message content, wherein the third message is in a different message format than the first message.

17. A non-transitory computer-readable storage medium for providing a messaging service, the non-transitory computer-readable storage medium comprising computer-executable instructions for:
receiving a first message subscription service request at a router, the first message subscription service request including message criteria;
receiving a second message subscription service request at the router, the second message subscription service request including the message criteria;
determining a first sending agent based on the first message subscription service request;
determining a second sending agent based on the second message subscription service request, wherein the first sending agent and the second sending agent are associated with different respective modes of communication;
receiving a first message at the router, the first message including a message parameter and message content;
determining whether the message criteria match the message parameter; and
in response to a determination that the message criteria match the message parameter:
routing the first message to the determined first sending agent;
generating a second message at the first sending agent based on the first message and the first message subscription service request, wherein the second message includes the message content;
routing the first message to the determined second sending agent; and
generating a third message at the second sending agent based on the first message and the second message subscription service request, wherein the third message includes the message content, and wherein the second message and the third message are sent via different modes of communication.

18. The non-transitory computer-readable storage medium of claim 17, wherein determining the first sending agent includes determining the first sending agent from a plurality of sending agents, wherein the first sending agent is at least one of an email-generating sending agent, a text-generating sending agent, a websocket-generating sending agent, and a webhook-generating sending agent, and
wherein determining the second sending, agent includes determining the second sending agent from the plurality of sending agents, wherein the second sending agent is at least one of an email-generating sending agent, a text-generating sending agent, a websocket-generating sending agent, and a webhook-generating sending agent.

19. The non-transitory computer-readable storage medium of claim 17, further comprising computer-executable instructions for:
receiving a third message subscription service request at the router, the third message subscription service request including second message criteria;
receiving a fourth message at the router, the fourth message including a second message parameter;
determining whether the second message criteria match the second message parameter; and
in response to a determination that the second message criteria match the second message parameter:
routing the fourth message to the sending agent; and
generating a fifth message at the sending agent based on the fourth message and the second message subscription service request.

20. The non-transitory computer-readable storage medium of claim 17, further comprising computer-executable instructions for:
routing the first message to a persistent store including a distributed database management system; and
saving the first message in the persistent store.

21. The non-transitory computer-readable storage medium of claim 20, further comprising computer-executable instructions for:
receiving a request for the first message stored in the persistent store;
retrieving the first message from the persistent store; and
sending the first message to a message persistence service based on the request.

22. The non-transitory computer-readable storage medium of claim 20, wherein routing the first message to the persistent store is based on determining that the message criteria match the message parameter.

23. The non-transitory computer-readable storage medium of claim 17, wherein the first message is received from a message sender service.

24. The non-transitory computer-readable storage medium of claim 23, further comprising computer-executable instructions for:
detecting increased traffic at the message sender service; and
generating a second instance of the message sender service.

25. The non-transitory computer-readable storage medium of claim 23, further comprising computer-executable instructions for:
buffering the first message at a message queue before sending to the router.

26. The non-transitory computer-readable storage medium of claim 23, further comprising computer-executable instructions for:
detecting increased traffic at the message queue; and
generating a second instance of the message queue.

27. The non-transitory computer-readable storage medium of claim 17, further comprising computer-executable instructions for:
receiving a sixth message at the router, wherein the order of receipt of the first and sixth messages at the router is determined by a Representational State Transfer (REST) proxy load balancer.

28. The non-transitory computer-readable storage medium of claim 17, wherein the message parameter includes at least one of a channel identifier, a sender identifier, an event identifier, a message type, a message tag, a message address, and message content.

29. The non-transitory computer-readable storage medium of claim 17, further comprising computer-executable instructions for:
filtering messages between the router and at least one of the sending agents based on entitlements.

30. The non-transitory computer-readable storage medium of claim 29, wherein the entitlements are entries in a database that correlate a user with specific message parameter permissions.

31. The non-transitory computer-readable storage medium of claim 17, further comprising computer-executable instructions for:
evaluating the message subscription service request based on entitlements, and
rejecting the message subscription service request before generating a message subscription if the message subscription service request fails the evaluation.

32. The non-transitory computer-readable storage medium of claim 17, wherein generating the third message comprises converting the first message having the message content into the third message having the message content, wherein the third message is in a different message format than the first message.

33. A system for a messaging service, the system comprising:
a memory; and
one or more processors coupled to the memory and configured to:
receive a first message subscription service request at a router, the first message subscription service request including message criteria;
receive a second message subscription service request at the router, the second message subscription service request including the message criteria;
determine a first sending agent based on the first message subscription service request;
determine a second sending agent based on the second message subscription service request, wherein the first sending agent and the second sending agent are associated with different respective modes of communication;
receive a first message at the router, the first message including a message parameter and message content;
determine whether the message criteria match the message parameter; and
in response to a determination that the message criteria match the message parameter:
route the first message to the determined first sending agent;
generate a second message at the first sending agent based on the first message and the first message subscription service request, wherein the second message includes the message content;

route the first message to the determined second sending agent; and generate a third message at the second sending agent based on the first message and the second message subscription service request, wherein the third message includes the message content and wherein the second message and the third message are sent via different modes of communication.

34. The system of claim 33, wherein determining the first sending agent includes determining the first sending agent from a plurality of sending agents, wherein the first sending agent is at least one of an email-generating sending agent, a text-generating sending agent, a websocket-generating sending agent, and a webhook-generating sending agent, and wherein determining the second sending agent includes determining the second sending agent from the plurality of sending agents, wherein the second sending agent is at least one of an email-generating sending agent, a text-generating sending agent, a websocket-generating sending agent, and a webhook-generating sending agent.

35. The system of claim 33, wherein the one or more processors are configured to:

receive a third message subscription service request at the router, the third message subscription service request including second message criteria;

receive a fourth message at the router, the fourth message including a second message parameter;

determine whether the second message criteria match the second message parameter; and in response to a determination that the second message criteria match the second message parameter:
route the fourth message to the sending agent; and
generate a fifth message at the sending agent based on the fourth message and the second message subscription service request.

36. The system of claim 33, wherein the one or more processors are configured to:

route the first message to a persistent store including a distributed database management system; and save the first message in the persistent store.

37. The system of claim 36, wherein the one or more processors are configured to:

receive a request for the first message stored in the persistent store;

retrieve the first message from the persistent store; and send the first message to a message persistence service based on the request.

38. The system of claim 36, wherein routing the first message to the persistent store is based on determining that the message criteria match the message parameter.

39. The system of claim 33, wherein the first message is received from a message sender service.

40. The system of claim 39, wherein the one or more processors are configured to:

detect increased traffic at the message sender service; and generate a second instance of the message sender service.

41. The system of claim 39, wherein the one or more processors are configured to:

buffer the first message at a message queue before sending to the router.

42. The system of claim 39, wherein the one or more processors are configured to:

detect increased traffic at the message queue; and generate a second instance of the message queue.

43. The system of claim 33, wherein the one or more processors are configured to:

receive a sixth message at the router, wherein the order of receipt of the first and sixth messages at the router is determined by a Representational State Transfer (REST) proxy load balancer.

44. The system of claim 33, wherein the message parameter includes at least one of a channel identifier, a sender identifier, an event identifier, a message type, a message tag, a message address, and message content.

45. The system of claim 33, wherein the one or more processors are configured to:

filter messages between the router and at least one of the sending agents based on entitlements.

46. The system of claim 45, wherein the entitlements are entries in a database that correlate a user with specific message parameter permissions.

47. The system of claim 33, wherein the one or more processors are configured to:

evaluate the message subscription service request based on entitlements, and reject the message subscription service request before generating a message subscription if the message subscription service request fails the evaluation.

48. The system of claim 33, wherein generating the third message comprises converting the first message having the message content into the third message having the message content, wherein the third message is in a different message format than the first message.

\* \* \* \* \*

UNITED STATES PATENT AND TRADEMARK OFFICE
CERTIFICATE OF CORRECTION

PATENT NO.         : 10,313,295 B2
APPLICATION NO.    : 15/382431
DATED              : June 4, 2019
INVENTOR(S)        : Douglas E. Sherman et al.

Page 1 of 1

It is certified that error appears in the above-identified patent and that said Letters Patent is hereby corrected as shown below:

In the Specification

Column 15, Line 4, delete "determiend" and insert -- determined --, therefor.

Signed and Sealed this
Seventeenth Day of September, 2019

Andrei Iancu
*Director of the United States Patent and Trademark Office*